(12) United States Patent
Li

(10) Patent No.: US 6,461,681 B2
(45) Date of Patent: Oct. 8, 2002

(54) METHOD OF TREATING A SURFACE OF A POLYIMIDE

(75) Inventor: Guangjin Li, Singapore (SG)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/757,056

(22) Filed: Jan. 8, 2001

(65) Prior Publication Data

US 2002/0127341 A1 Sep. 12, 2002

(51) Int. Cl.$^7$ .................................................. B05D 1/02
(52) U.S. Cl. ....................................... 427/384; 427/422
(58) Field of Search ................................ 427/384, 422, 427/393.5

(56) References Cited

U.S. PATENT DOCUMENTS

| | | | | |
|---|---|---|---|---|
| 4,113,550 A | * | 9/1978 | Saiki et al. ................. | 252/79.1 |
| 4,218,283 A | * | 8/1980 | Saiki et al. ................. | 252/79.1 |
| 5,543,493 A | | 8/1996 | Park et al. ................... | 427/371 |
| 6,218,022 B1 | * | 4/2001 | Suzuki et al. ................ | 216/64 |

FOREIGN PATENT DOCUMENTS

JP         56-036527        *   4/1981

OTHER PUBLICATIONS

Patent Abstracts of Japan vol. 1999, No. 05, May 31, 1999 & JP 11 049880 A (P I Gijutsu Kenkyusho: KK) Feb. 23, 1999.
"Adhesion improvement of epoxy resin/polyimide joints by amine treatment of polyimide surface", H.K. Yun et al., Polymer vol. 38 No. 4, pp. 827–834, 1997.

* cited by examiner

*Primary Examiner*—Erma Cameron

(57) ABSTRACT

The invention relates to a method for treating a surface of a polyimide. According to the invention a solution containing a pentane functionalized with more than one amino moiety is applied to a polyimide surface and the polyimide surface to which the solution has been applied is dried at a temperature of between about 20° C. and about 120° C.

12 Claims, No Drawings

METHOD OF TREATING A SURFACE OF A POLYIMIDE

The present invention relates polyimide surfaces. Specifically, the present invention relates to a method of treating a polyimide surface, to treated polyimide surfaces as well as to items manufactured with treated polyimide surfaces.

BACKGROUND OF THE INVENTION

Polyimide is a kind of condensation polymer derived from bifunctional carboxylic acid anhydrides and primary diamines. Polyimide demonstrates excellent dielectric, thermal and mechanical properties, making it a very good circuit substrate in the microelectronic industry. In the manufacturing of inkjet cartridges, KAPTON (trademark of DuPont for polyimide products) is often used at flex-joint interfaces. Here, proper adhesion between on the one hand polyimide surfaces and on the other hand structural adhesives, encapsulants and/or barrier layers is indispensable for proper and sustained functioning of the inkjet cartridge. Loss of adhesion in such interfaces may cause delamination, ultimately leading to ink-leakage and/or electrical shorts. In fact, failures due to KAPTON/encapsulant and KAPTON/structure adhesive delamination represent the main causes of malfunction for some families of inkjet cartridges.

Up to now, existing methods for improving polyimide adhesion primarily involved chemical modification of a polyimide surface, and can be roughly categorized as dry or wet methods.

Plasma treatment represents the most common dry method of modifying the polyimide surface. Typical plasma treatment methods use plasma to effect chemical change on the polyimide surface. Here, the goal is to positively affect the nature of the surface (such as the surface wetability) without deleteriously modifying the bulk properties of the inner polyimide material. Plasma treatment methods are, however, typically fraught with a major disadvantage, namely the poor long-term stability of the plasma-activated polyimide surface. Extended storage times, contact with humidity as well as elevated temperatures very rapidly attenuate the beneficial effect of plasma on polyimide surfaces, severely limiting the practical usage of this technique.

Wet methods for modification of polyimide surfaces typically involve the use of alkaline reagents. These methods exploit the ring-opening reaction between alkaline and the imide ring of the polyimide. Potassium hydroxide and other similar reagents such as sodium hydroxide or ammonium hydroxide are most commonly used in modifying polyimide surfaces. Treatment with alkaline solution followed by rinsing with acid converts the polyimide surfaces into polyamic acids. Polyamic acids convert back to amorphous polyimide at lower temperatures (150–250° C.) and, at higher temperatures (350–400° C.), to crystallized polyimide. Disadvantages associated with wet modification methods of this type include the following:

(a) the manufacturing process is complicated by the use of corrosive bases and acids;
(b) incomplete cleaning of the surface following base and/or acid treatment leads to undesired residual impurities which contaminate the surface;
(c) the use of strong bases and acids may also corrode metal traces and change the physical dimensions of desirable fine architectures on the surface.

Several methods have been proposed in the prior art as ways of alleviating problems such as those above.

In U.S. Pat. No. 5,543,493 issued Aug. 6, 1999 for "Method For Treating A Polyimide Surface" assigned to Samsung Electronics Co., Ltd., a polyimide surface is chemically treated with aliphatic, aromatic or siloxane amines and is then dried. Such treatment was found to increase the adhesion strength between a polyimide surface treated in this way and adhesive.

A further mode of modification is described in "Adhesion improvement of epoxy resin/polyimide joints by amine treatment of polyimide surface", H. K. Yun et al., Polymer Vol. 38 No. 4, pp. 827–834, 1997. This article describes the modification of polyimide surfaces to improve adhesion strength by immersing polyimide materials in amine solutions and then drying the thusly treated polyimide materials. Here, the adhesion strength was found to increase with increasing molecular weight of the amine used for treatment. Higher molecular weight of the amine used for treatment was also found to require higher subsequent drying temperatures, so that higher adhesion strengths were generally found to necessitate higher drying temperatures.

In light of the importance as described above of polyimide surface adhesion propensity, it is therefore a goal of the present invention to improve this adhesion propensity.

SUMMARY OF THE INVENTION

This goal is met by provision of a method for treating the surface of a polyimide as set out in claim 1. In a method for treating polyimide surfaces, a solution containing a pentane functionalized with more than one amino moiety is applied to a polyimide surface. Following this application, the polyimide surface to which the solution has been applied is then dried at a temperature of between approximately 20° C. and approximately 120° C.

An advantage of the method according to the invention is that improved polyimide adhesion is effected while avoiding less rigorous conditions than usually required by related methods for the modification of polyimide surfaces. For example, according to the inventive method, drying the polyimide surface treated with amine at temperatures as low as ambient (i.e. "room") temperature (defined within the scope of the present invention as approximately 20° C.) following treatment of the polyimide surface with the pentane amine is sufficient to engender the desired adhesion enhancement.

That the drying step of the polyimide surface following treatment of the polyimide surface with the pentane amine can be performed at as low as ambient temperature renders the inventive method highly economical, as costly heating elements and power consumption associated therewith are avoided in the treatment process.

A major advantage of the method according to the invention is that polyimide surfaces modified according thereto demonstrate a vast improvement in adhesion propensity to a variety of materials, for example structural adhesives, encapsulants and barrier layer materials, under highly humid adhesion conditions. This is important because the conditions which prevail, for example, in an inkjet cartridge with liquid (i.e. water-based) ink storage fall into this category of humid adhesion conditions. This means that polyimide surfaces modified according to the method of the invention are especially amendable to adhesion to structural adhesives, encapsulants and/or barrier layer materials of inkjet cartridges and are therefore very well suited to use in the construction of such inkjet cartridges.

The goal of the invention is also met by provision of a method for treating a surface of a polyimide as set out in claim 16. In a method of treating a surface of a polyimide according to the invention, a solution containing an aliphatic amine functionalized with more than one amine moiety is sprayed onto a polyimide surface. The polyimide surface to which the solution has been sprayed is then dried.

As described above for the method for treating a surface of a polyimide according to claim 1, the method for treating a surface of a polyimide according to claim 16 benefits from the fact that both the spraying as well as the drying processes can be carried out at ambient temperature, thereby simplifying construction and procedural aspects of polyimide modification. That the solution containing the multifunctionalized aliphatic amine is sprayed onto the polyimide surface to be treated means that costly and cumbersome baths for immersion (the common method of application) can be dispensed with in favor of nozzles which are generally easier to operate, control and maintain.

DETAILED DESCRIPTION OF THE INVENTION

According to one embodiment of the inventive method, polyimide films, for example KAPTON-films, can be dipped into solutions of pentane amine. Such solutions are preferably in water, an alcohol containing 1 to 4 carbons, or combinations thereof and preferably contain 0.1–0.5% vol/vol percent of pentane amine. Here, the temperature can be ambient temperature, say approximately 20° C., however, elevated immersion temperatures of up to approximately 80° C. also yield advantageous results. Immersion of the polyimide film into the above solution generally takes place for 5–30 minutes, and drying of the thusly treated polyimide film follows for about an hour at temperatures ranging from ambient temperature up to approximately 120° C.

For the case that the amine solution is to be in pure alcohol containing 1 to 4 carbons or in a mixture of this alcohol with water, the inventors have found that the alcohol containing 1 to 4 carbons advantageously contains 3 carbons, i.e. it is propanol. Preferably, the propanol used is isopropanol. For the case that the amine solution is in a mixture of isopropanol and water as the solvent system, it is preferable to use a 1:1 vol/vol mixture of these two components.

It should be emphasized here that the immersion as well as the drying of the polyimide film can be carried out at ambient temperatures while not sacrificing the resulting adhesion strength, thereby simplifying the treatment method as a whole.

In a preferred embodiment of the method according to the invention, pentane amine-containing solutions can be applied onto the polyimide film by spraying. Spraying can take place at temperatures ranging from ambient temperature, say approximately 20° C., up to approximately 80° C. Drying of the thusly treated polyimide films subsequently takes place as previously described above for immersion-treated polyimide films. Here, as above, it should be emphasized that both the application as well as the drying steps can be carried out at temperatures as low as ambient temperature, thereby greatly simplifying the method as a whole.

It should also be emphasized that in each of the two embodiments described above, positive results can be achieved using solutions of pentane amine containing as little as approximately 0.1% vol/vol of pentane amine. Such low concentrations of pentane amine allow the conservation of process material, thereby implying a further savings in processing cost.

Pentane amines used to functionalize polyimide surfaces according to the method of the invention are preferably pentane diamines of the general formula x,y-diaminopentane, wherein x and y each range independently and integrally from 1 to 5, inclusively. Especially preferred is the use of 1,5-diaminopentane. The inventors have found that the latter compound yields highly advantageous results with respect to the adhesion propensity of the polyimide film following completion of treatment.

According to a preferred embodiment of the method according to the invention in which the amine-containing solution is sprayed onto the polyimide surface, the aliphatic amine used is preferably an aliphatic diamine, an aliphatic triamine or an aliphatic pentamine. Of each of these, 1,5-diaminopentylamine, diethylenetriamine and tetraethylenepentamine, respectively, are especially preferred. Other conditions such as those of solvent system, treatment temperature and drying temperature are as outlined above for preferred embodiments.

The following examples are intended to illustrate advantages of the method according to the invention and in no way limit the scope of the invention.

EXAMPLE 1

Dry Peel Strength as Measured Between Treated KAPTON Polyimide/structural Adhesive 1,5-diaminopentane was applied to KAPTON films by immersion of KAPTON polyimide in solutions of 0.5% vol/vol 1,5-diaminopentane (DAP), diethylenetriamine (DETA) and tetraethylenepentamine (TEPA) in 1:1 water/isopropyl alcohol at ambient temperature for five minutes followed by drying at 120° C. for one hour. Peel strength was determined by applying structural adhesive onto the KAPTON film treated as above. The structural adhesive was cured at 160° C. for 10 minutes prior to peeling. The peel strength, in units of lbf (pounds per square foot), for an untreated KAPTON film control was determined to be 0.82 lbf. In contrast, the KAPTON films treated with 1,5-diaminopentane, diethylenetriamine and tetraethylenepentamine and dried under the conditions indicated above were found to yield subsequent peel strengths of 5.06 lbf, 5.40 lbf and 3.06 lbf, respectively. As compared to an untreated KAPTON control film, a polyimide KAPTON film treated under the conditions indicated above was therefore capable of engendering a several-fold increase in peel strength.

EXAMPLE 2

Wet Peel Strength as Measured Between Treated KAPTON Polyimide/structural Adhesive While certainly an indication of the ability of the inventive method to increase adhesion strength between polyimide films and structural adhesive, the above dry peel strength is, however, not representative of the peel strength which might be expected under the (highly humid) conditions normally prevailing in an inkjet cartridge. Accordingly, an ink-soak test was performed by soaking KAPTON polyimide films treated and bound to structural adhesives as described in Example 1 for two weeks at 60° C. in a black ink manufactured by Hewlett Packard in order to more closely simulate the behavior of the polyimide/structural adhesive interface which would be expected in an actual inkjet cartridge. The peel strength, again in units of lbf, of the non-treated control of Example 1, following soaking in the ink for two weeks at 60° C. resulted in a peel strength of 0.39 lbf. In contrast, the KAPTON polyimide film treated with 1,5-diaminopentane, according to the invention, resulted in a peel strength of 1.19 lbf.

Relative to the untreated control, the KAPTON polyimide film treated with 1,5-diaminopentane under the conditions given in Example 1 therefore leads to an approximately three-fold improvement in peel strength under the highly moist conditions which would be expected to prevail in an actual inkjet cartridge.

However, for KAPTON films which had been treated with either diethylenetriamine (DETA) or tetraethylenepentamine (TEPA), the wet peel strengths were found to be either comparable or even worse than the corresponding peel strength of untreated KAPTON polyimide film. The results suggest that, although diethylenetriamine (DETA) and tetraethylenepentamine (TEPA) may be useful in improving the adhesion of polyimide/structural adhesive, such improvement is observed only under dry conditions; DETA and TEPA are not good candidates for improving the adhesion strength of products working under humid conditions for prolonged periods of time.

EXAMPLE 3

Adhesion of KAPTON Polyimide/structural Adhesive in an Inkjet Cartridge

In order to obtain as direct information as possible as to the enhancement of polyimide adhesion propensity enabled by the method according to the invention, KAPTON polyimide films were treated according to the invention and then actually used in existing inkjet cartridges. A solution of 0.5% vol/vol 1,5-diaminopentane (DAP) in 1:1 water/isopropyl alcohol was sprayed onto a KAPTON polyimide surface at ambient temperature, and the surface was dried for one hour at 120° C. The KAPTON polyimide film was then built into a cartridge for a standard accelerated test. The performance of the cartridge was evaluated according to two criteria: a) the percentage of electrical test failures, (i.e. electrical shorts induced by ink contact with active traces caused by delamination at interfaces such as KAPTON polyimide/structural adhesive) after an accelerated test and b) the percentage of failures due to KAPTON polyimide/structural adhesive delamination after an accelerated test. Each of these two parameters was measured after two, and then four weeks of storage at 60° C. The results are summarized in Table 1 below for DAP as compared to an untreated control (CTRL). Different sets of cartridges were used for the 2- and the 4-week measurements, as the determination of failures sometimes entailed destruction of the soaked cartridges, thereby precluding further soaking of the same cartridges. The history (i.e. material lot, production line, etc.) of the cartridges used in the tests was carefully monitored so as to ensure maximum uniformity of material entering the tests and, hence, to minimize artefactual fluctuation of results between individual cartridges and/or cartridge lots.

TABLE 1 summary of failures after 2 and 4 weeks of accelerated tests (15 cartridges for each group)

|  | Electrical test failures (electrical shorts) | | KAPTON/structural adhesive delamination failures | |
| --- | --- | --- | --- | --- |
|  | CTRL | DAP | CTRL | DAP |
| 2 weeks at 60° C. | 46.7% (7/15) | 6.7% (1/15) | 33.3% (5/15) | 6.7% (1/15) |
| 4 weeks at 60° C. | 93.3% (14/15) | 0% (0/15) | 93.3% (14/15) | 0% (0/15) |

As can be seen in Table 1, treatment of KAPTON polyimide films by the method according to the invention leads to a marked improvement in the long-term performance of the inkjet cartridges containing this modified KAPTON films. After storage at 60° C. for 4 weeks, almost all control cartridges suffered electrical failure and KAPTON polyimide/structural adhesive delamination. This stands in stark contrast to the minimal failure rate by either measure (i.e. electrical or delamination failure) observed for cartridges containing KAPTON polyimide the surface of which had been previously modified with DAP according to the method of the invention.

EXAMPLE 4

Adhesion of KAPTON Polyimide/barrier Material

The "barrier" in an inkjet cartridge is the polymer material lying under the KAPTON film on the cartridge print head. The barrier material is a special kind of adhesive and forms the channels which are indispensable for proper ink flow during printing. It is important and desirable to improve the adhesion between the KAPTON polyimide and the barrier to avoid electrical failures and to ensure the proper functioning of the cartridge.

In this experiment, a solution of 1,5-diaminopentane was applied to the KAPTON polyimide surface of flex joints as described above in Example 3 (i.e. by spraying). Solution and drying conditions were also as described in Example 3, above. A barrier was then applied to the pre-treated flex joint and cured by normal processes to form tab head assemblies (THAs). The parts formed in this way were then tested by an autoclave test, which is an accelerated test to study the adhesion between the KAPTON polyimide and the barrier layer. Delamination scores were then assigned based on visual inspection of the delamination of the KAPTON/barrier interface. Delamination scores were assigned on the scale of 0–5, with higher scores representing more severe delamination and lower scores representing better polyimide/barrier adhesion.

Following the autoclave test, it was determined that the THAs containing KAPTON polyimide pretreated with 1,5-diaminopentane as described in Example 3 had an average delamination score of 0.5 as compared to an average delamination score of 3.4 for the THAs containing the untreated control KAPTON polyimide. This corresponds to an approximately 85% reduction in polyimide/barrier delamination using KAPTON polyimides treated with 1,5-diaminopentane as compared to untreated KAPTON polyimide in ink cartridges.

EXAMPLE 5

Adhesion of KAPTON Polyimide/barrier in THAs of Ink Jet Cartridges as Dependent on the Solvent used during Amine Treatment and as Dependent on Drying Temperature Another experiment was performed in order to determine the effect of varying the solvent of the amine solution and, independently, the temperature used for drying subsequent to amine treatment. The solvent system was varied from a 1:1 mixture of water and isopropyl alcohol to water alone and the drying temperature was changed from 120° C. to ambient temperature (i.e. about 20° C.). The concentration of the solution was maintained for all experiments at 0.5% vol/vol of 1,5-diaminopentane. The delamination scores and peel strengths following the autoclave tests are shown below in Table 2. The scoring system of 0–5 used for rating delamination is as described above in Example 4. The peel strength measurement is as described in Examples 1 and 2, with higher peel strengths indicating better interfacial adhesion.

TABLE 2

| Sample | Drying Temperature | Solvent System | Delamination Score | Peel strength (lbf) |
|---|---|---|---|---|
| Control (no treatment of polyimide) | — | — | 4.1 | 0.05 |
| 1 | 120° C. | 1:2 vol/vol water/isopropanol | 3.1 | 0.30 |
| 2 | 120° C. | Water | 3.2 | 0.39 |
| 3 | 20° C. | Water | 3.2 | 0.32 |

As compared to the control pen containing untreated KAPTON polyimide, Table 2 shows that treatment of the KAPTON polyimide according to the invention resulted in an remarkable improvement in delamination score as well as in the peel strength as compared to untreated KAPTON polyimide, irrespective of the specific treatment conditions used. A comparison of samples 2 and 3 in Table 2 shows that changing the temperature used for drying the KAPTON polyimide film after treatment with 1,5-diaminopentane in a solvent system of purely water has virtually no effect on the final delamination score and peel strength observed. This represents a major advantage of the method according to the invention, demonstrating as it does that satisfactory results can be obtained with temperatures as low as ambient temperature using simple solvent systems such as water. During the drying step there is therefore no need to implement elevated temperatures which would otherwise complicate production as well as drive up production cost.

A comparison of samples 1 and 2 in Table 2 show that, based on the results of final delamination score and peel strength obtained, changing the solvent from an equal-volume mixture of water and isopropanol to water alone at constant drying temperature does not have much effect on the adhesion between KAPTON polyimide/barrier film. This is of special importance considering that it is much easier and more environmentally conscious to use water alone as the solvent during the processing, as the use of water does not entail any health hazards or risk of fires or explosions. In contrast, the use of a solvent system containing alcohol is very complicated from the standpoint of practical processing.

In total, Table 2 shows that the method according to the invention for treating a polyimide surface has a high inherent degree of flexibility with respect to drying temperature and the solvent system used while not sacrificing the advantageous enhancement of adhesion propensity. This methodological flexibility translates into an increased degree of latitude in designing new apparati and/or retrofitting old apparati for the production of treated polyimide surfaces according to the invention.

EXAMPLE 6
Adhesion of KAPTON Polyimide/barrier in THAs of Ink Jet Cartridges as Dependent on the Concentration of DAP used during Amine Treatment Another experiment was performed in order to determine the effect of varying the concentration of the amine solution used for treatment. The solvent in this experiment was water and the drying temperature was ambient temperature (i.e. about 20° C.). The concentration of the solution was varied from 0.1% to 0.5% vol/vol 1,5-diaminopentane. After THAs were built using standard processes, an autoclave test was performed on the parts followed by delamination score grading and testing of peel strength to evaluate the KAPTON polyimide/barrier layer adhesion. The delamination scores and the peel strength results following the autoclave tests are listed below in Table 3. The scoring system of 0–5 used for rating delamination is as described above in Example 4. The peel strength measurement is as described in Example 1 and 2.

TABLE 3

| Sample | Concentration % vol/vol of 1,5-diaminopentane | Delamination Score | Peel strength (lbf) |
|---|---|---|---|
| Control (no treatment of polyimide) | — | 3.8 | 0.05 |
| 1 | 0.1 | 3.0 | 0.31 |
| 2 | 0.3 | 3.0 | 0.35 |
| 3 | 0.5 | 3.3 | 0.47 |

As compared to the control, all samples treated with DAP showed marked improvement in adhesion. This is consistent with the results shown in Example 5. Reducing the solution concentration of 1,5-diaminopentane from 0.5% to 0.1% vol/vol, no significant change of delamination score was observed, while a slightly lower peel strength was obtained. These results confirm that satisfactory adhesion can be obtained with solution concentrations of 1,5-diaminopentane ranging from 0.1% to 0.5% vol/vol.

In total, Table 3 shows that the method according to the invention for treating a polyimide surface offers a high degree of flexibility with respect to solution concentrations of DAP while not sacrificing much in terms of interfacial adhesion. Lower concentrations of DAP in solution translate into lower cost of raw materials and fewer concerns during processing with respect to safety and environmental issues.

What is claimed is:

1. A method for treating a surface of a polyimide comprising:

applying a solution including 1,5-diaminopentane to a polyimide surface, wherein the solution is applied by spraying at a temperature of between about 20° C. and about 80° C.; and drying the polyimide surface to which the solution has been applied at a temperature of between about 20° C. and about 120° C.

2. The method of treating a surface of a polyimide according to claim 1, wherein the spraying is performed at ambient temperature.

3. The method of treating a surface of a polyimide according to claim 1, wherein the drying is performed at ambient temperature.

4. The method of treating a surface of a polyimide according to claim 1, wherein the solution is in water.

5. The method of treating a surface of a polyimide according to claim 1, wherein the solution is in an alcohol containing 1 to 4 carbons.

6. The method of treating a surface of a polyimide according to claim 1, wherein the solution is in a mixture of water and an alcohol containing 1 to 4 carbons.

7. The Method of treating a surface of a polyimide according to claim 5, wherein the alcohol is a propanol.

8. The method of treating a surface of a polyimide according to claim 6, wherein the alcohol is a propanol.

9. The method of treating a surface of a polyimide according to claim 7, wherein the propanol is isopropanol.

10. The Method of treating a surface of a polyimide according to claim 8 wherein the propanol is isopropanol.

11. The method of treating a surface of a polyimide according to claim 10, wherein the mixture of water and isopropanol is a 1:1 v/v mixture.

12. The method of treating a surface of a polyimide according to claim 1, wherein the solution concentration of the 1,5-diaminopentane ranges from 0.1 to 0.5 w/v %.

* * * * *